United States Patent [19]

Naito

[11] Patent Number: 5,463,604

[45] Date of Patent: Oct. 31, 1995

[54] OPTICAL DISC WITH DATA RECORDED AT DIFFERENT RATES ON DIFFERENT ZONES AND RECORDING APPARATUS, AND REPRODUCING APPARATUS THEREFOR

[75] Inventor: Ryuichi Naito, Tokorozawa, Japan

[73] Assignee: Pioneer Electronic Corporation, Tokyo, Japan

[21] Appl. No.: 25,175

[22] Filed: Mar. 2, 1993

[30] Foreign Application Priority Data

Mar. 13, 1992 [JP] Japan .................................. 4-055201
Sep. 1, 1992 [JP] Japan .................................. 4-233544

[51] Int. Cl.⁶ ................................................ G11B 7/00
[52] U.S. Cl. ................................................ 369/50; 369/48
[58] Field of Search ............................... 369/47, 48, 50, 369/51, 43, 59, 124

[56] References Cited

U.S. PATENT DOCUMENTS

| | | | |
|---|---|---|---|
| 4,603,412 | 7/1986 | Yamazaki | 369/50 |
| 4,896,311 | 1/1990 | Ishihara | 369/50 |
| 4,918,677 | 4/1990 | Ashinuma et al. | 360/51 X |
| 4,977,550 | 12/1990 | Furuya et al. | 369/50 |
| 5,058,089 | 10/1991 | Yoshimaru et al. | 369/47 |
| 5,063,552 | 11/1991 | Shigemori | 369/50 |
| 5,153,869 | 10/1992 | Yoshimaru et al. | 369/50 |
| 5,224,086 | 6/1993 | Wachi | 369/50 |
| 5,243,587 | 9/1993 | Itoh et al. | 369/50 X |
| 5,253,118 | 10/1993 | Konno | 369/50 |

Primary Examiner—Aristotelis Psitos
Assistant Examiner—Thang V. Tran
Attorney, Agent, or Firm—Kane, Dalsimer, Sullivan, Kurucz, Levy, Eisele and Richard

[57] ABSTRACT

An optical disc recording apparatus for dividing an information record surface of an optical disc into a plurality of record zones and recording information at a data rate which differs for every record zone, is provided with: a drive device for rotationally driving the optical disc by a constant angular velocity; a frequency conversion device for converting a clock frequency of input clock data corresponding to record data inputted from the external which is to be recorded on the optical disc, to record clock data corresponding to the record zone to be recorded, and outputting the record clock data; a memory device for storing the record data by a timing corresponding to the input clock data, and outputting the record data on the basis of the record clock data; and a record device for recording the record data outputted from the memory device, to the optical disc.

12 Claims, 9 Drawing Sheets

| | DATA RECORD AMOUNT PER ONE TRACK | RECORD CLOCK fw | REPRODUCTION CLOCK fr |
|---|---|---|---|
| ZONE 1 | $\frac{4}{4}Q$ | $\frac{4}{4}f_i$ | $\frac{4}{4}f_o$ |
| ZONE 2 | $\frac{5}{4}Q$ | $\frac{5}{4}f_i$ | $\frac{5}{4}f_o$ |
| ZONE 3 | $\frac{6}{4}Q$ | $\frac{6}{4}f_i$ | $\frac{6}{4}f_o$ |
| ZONE 4 | $\frac{7}{4}Q$ | $\frac{7}{4}f_i$ | $\frac{7}{4}f_o$ |

OPTICAL DISC WITH DATA RECORDED AT DIFFERENT RATES ON DIFFERENT ZONES AND RECORDING APPARATUS, AND REPRODUCING APPARATUS THEREFOR

BACKGROUND OF THE INVENTION

1. Field of the Invention

The present invention relates to an optical disc recording apparatus, an optical disc reproducing apparatus, an optical disc recording and reproducing apparatus, and an optical disc. Especially, the present invention relates to a recording apparatus, a reproducing apparatus, a recording and reproducing apparatus and an optical disc of ZCAV (Zoned Constant Angular Velocity) system.

2. Description of the Related Art

There are a CAV (Constant Angular Velocity) system, a CLV (Constant Linear Velocity) system, etc. as a recording and reproducing system of digital data of an optical disc.

In the CAV system, the access speed is high, since the number of rotations of the optical disc, i.e., the angular velocity, is constant. Therefore, the line velocity becomes low at the inner circumferential side of the optical disc, and becomes high at the outer circumferential side. For this reason, the recording density of the outer circumferential side becomes low. The recording time comes to be proportional to the diameter of the optical disc.

In the CLV system, the line velocity becomes constant. This is because the number of rotations of the optical disc is great at the inner circumferential side and is little at the outer circumferential side. Therefore, the recording time is proportional to the area of the optical disc. The data rate is fixed or constant irrespective of the recording position. As the result, it becomes possible to perform record and reproduction of data of high density.

Here, the outline of recording and reproducing operation of the recording and reproducing apparatus of CLV system optical disc (hereinbelow, it is called as "CLV disc"), will be explained.

The recording and reproducing apparatus extracts a reproduction clock signal from the reproduction signal of the CLV disc at the time of information reproduction of the CLV disc. The recording and reproducing apparatus applies a servo-control to a spindle motor so that this reproduction clock signal may become to have a fixed frequency. As the result, the reproduction data rate of the record data on the CLV disc becomes fixed. On the other hand, at the time of information recording, the recording and reproducing apparatus reads the CLV disc by an optical pickup. A pregroove and a prepit are formed on the record track position of the CLV disc beforehand. The recording and reproducing apparatus rotationally drives the CLV disc so that the reproduction clock of the reproduction signal may become constant. The recording and reproducing apparatus records data inputted at a fixed data rate.

On the other hand, there are a ZCAV system and a MCAV (Modified Constant Angular Velocity) system, which realize a high density record and reproduction, by fixing the number of rotations of the optical disc.

This ZCAV system divides the record area of the optical disc into two or more zones. The ZCAV system rotationally drives the optical disc by a constant angular velocity. The ZCAV system sets constant the data rate of record and reproduction in the same zone, and sets higher the data rate of record and reproduction in the outer zone than that in the inner zone. Therefore, the ZCAV system can record and reproduce more data per one track than the CAV system.

In the CAV system, since the angular velocity is constant, the access speed is high. However, there is a problem that a recording density becomes low. On the other hand, in the CLV system, the recording density is high. However, in order to make the line velocity constant, there is the necessity of changing the number of rotations of the optical disc in accordance with the radius of a reading position. For this reason, it takes time for the rotation to be stabilized, and thus, there is a problem that the access speed becomes low. Furthermore, the data rate changes for every record zone in the ZCAV system. Therefore, there is a problem that it cannot be used in recording and reproducing a signal which requires a constant data rate such as an image data and a sound data.

SUMMARY OF THE INVENTION

It is therefore an object of the present invention to provide an optical disc recording apparatus, an optical disc reproducing apparatus, an optical disc recording and reproducing apparatus and an optical disc, which can improve the access speed, and can make the information recording density high, in record and reproduction of the information which requires a fixed input-and-output data rate.

According to the present invention, the above mentioned object can be achieved by an optical disc recording apparatus for dividing an information record surface of an optical disc into a plurality of record zones and recording information at a data rate which differs for every record zone. The optical disc recording apparatus is provided with: a drive device for rotationally driving the optical disc by a constant angular velocity; a frequency conversion device for converting a clock frequency of input clock data corresponding to record data inputted from the external which is to be recorded on the optical disc, to record clock data corresponding to the record zone to be recorded, and outputting the record clock data; a memory device for storing the record data by a timing corresponding to the input clock data, and outputting the record data on the basis of the record clock data; and a record device for recording the record data outputted from the memory device, to the optical disc.

According to the present invention, the above mentioned object can be also achieved by an optical disc reproducing apparatus for reproducing an optical disc, which information record surface is divided into a plurality of record zones and to which information is recorded at a data rate which differs for every record zone. The optical disc reproducing apparatus is provided with: a drive device for rotationally driving the optical disc by a constant angular velocity; an optical pickup device for reading record data on the optical disc, and outputting it as a reproduction data; a clock extraction device for extracting reproduction clock data from the reproduction data; and a memory device for storing the reproduction data by the timing corresponding to the reproduction clock data, and outputting the reproduction data on the basis of output clock data inputted from the external.

According to the present invention, the above mentioned object can be also achieved by an optical disc recording and reproducing apparatus for dividing an information record surface of an optical disc into a plurality of record zones and recording information at a data rate which differs for every record zone. The optical disc recording and reproducing apparatus is provided with: a drive device for rotationally driving the optical disc by a constant angular velocity; a frequency conversion device for converting a clock frequency of input clock data corresponding to record data inputted from the external which is to be recorded on the optical disc, to record clock data corresponding to the record zone to be recorded, and outputting the record clock data; a memory device for storing the record data by a timing corresponding to the input clock data, and outputting the record data on the basis of the record clock data; an optical pick up device for recording the record data outputted from the memory device, to the optical disc, and for reading the record data on the optical disc and outputting it as a reproduction data; and a clock extraction device for extracting reproduction clock data from the reproduction data, the memory device being adapted to storing the reproduction data from the optical pickup device by the timing corresponding to the reproduction clock data, and outputting the reproduction data on the basis of output clock data inputted from the external.

According to the present invention, the above mentioned object can be achieved by an optical disc provided with: a substrate of disc shape; and information record surface formed on the substrate, which is divided into N record zones (N: natural number), to which information is recordable at a data rate which differs for every record zone, wherein information amount Q is recorded in one record track of the record zone located at an inner most circumferential side of the optical disc, the information amount $(N+n-1) \cdot Q/N$ is recorded in a nth record track (n:1, 2, ... , N) counted from the inner most circumferential side of the optical disc.

According to the optical disc recording apparatus of the present invention, the frequency conversion device converts the clock frequency of the input clock data corresponding to the record data inputted from the external. The frequency conversion device outputs the record clock data, corresponding to the record zone to which the data is to be recorded, to the memory device. The memory device stores the record data by the timing corresponding to the input clock data. The memory device outputs it to the record device on the basis of the record clock data. The record device records the record data outputted from the memory device, to the optical disc rotationally driven by a constant angular velocity by drive device. Therefore, even if the input clock data is fixed, the optical disc recording apparatus of the present invention, is able to record the record data, by timing of the record clock data corresponding to each record zone of the optical disc, i.e. the data rate corresponding to each record zone.

According to the optical disc reproducing apparatus of the present invention, the optical pickup device reads the record data on the optical disc rotationally driven by a constant angular velocity by the drive device. The optical pickup device outputs it to the clock extraction device as a reproduction data. The clock extraction device extracts the reproduction clock data from the reproduction data, and outputs it to the memory device. The memory device stores the reproduction data, by the timing corresponding to the reproduction clock data. The memory device outputs this on the basis of the output clock data inputted from the external. Therefore, even if the data is recorded on the optical disc such that the data rates for the record zones are different from each other, the optical disc reproducing apparatus of the present invention, can output a reproduction data to the external at a fixed data rate.

According to the optical disc recording and reproducing apparatus of the present invention, the above mentioned advantageous effects of the optical disc recording apparatus and the optical disc reproducing apparatus can be realized by a single apparatus.

According to the optical disc of the present invention, the information amount recorded in one record track of the record zone of the optical disc located in the most inner circumferential side, is Q, wherein the information amount $(N+n-1) \cdot Q/N$, is recorded on one record track of the nth record zone (n:1, 2, ... , N) counted from the inner circumferential side of the optical disc.

Therefore, the recording information density can be increased in the optical disc of the present invention, by use of the above mentioned optical disc recording apparatus and optical disc reproducing apparatus of the present invention.

The nature, utility, and further features of this invention will be more clearly apparent from the following detailed description with respect to preferred embodiments of the invention when read in conjunction with the accompanying drawings briefly described below.

DETAILED DESCRIPTION OF PREFERRED EMBODIMENTS

Nextly, the embodiments of the present invention will be explained with reference to FIGS. 1 to 11.

First Embodiment

Figure 1:
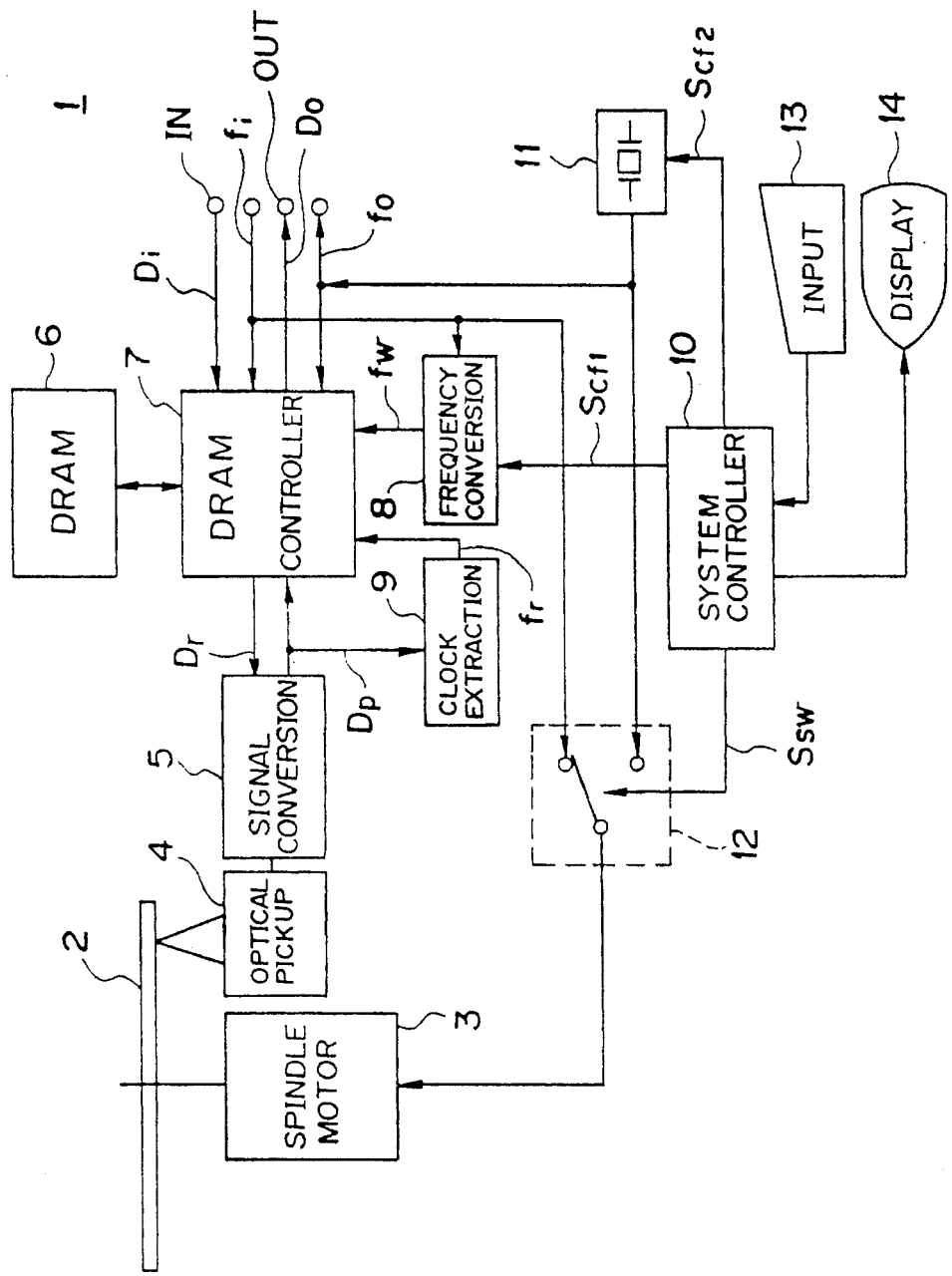
FIG. 1 is a block diagram which indicates the basic construction of a first embodiment.

FIG. 1 is a block diagram of the basic construction of a first embodiment. In this case, the recording and reproducing apparatus of write-once type optical disc, such as an organic coloring-matter type optical disc and a phase-modulation type optical disc, is explained for simplification of explanation.

An optical disc recording and reproducing apparatus 1 has a spindle motor 3, an optical pickup 4, a signal conversion circuit 5, a DRAM (Dynamic Random Access Memory) 6, a DRAM controller 7, a frequency conversion circuit 8, a clock extraction circuit 9, a system controller 10, an output clock frequency Generation circuit 11, a change switch 12, an input operation section 13, and a display section 14.

The spindle motor 3 rotationally drives the optical disc 2. The optical pickup 4 records a record signal. By irradiating a laser beam, a record signal is inputted into the rotationally driven optical disc 2. The optical pickup 4 receives the laser beam reflected by the optical disc 2, and reproduces record information. The optical pickup 4 outputs it as a reproduction signal.

The signal conversion circuit 5 converts record data Dr, and outputs the conversion result to the optical pickup 4 as a record signal. The signal conversion circuit 5 converts a reproduction signal, and outputs the conversion result as reproduction data Dp. The DRAM 6 once stores input data Di and the reproduction data Dp. The DRAM controller 7 controls the input and output of data to the DRAM 6. On the basis of first frequency control signal Scf1, the frequency conversion circuit 8 converts the frequency of an input clock fi, and to a record clock fw.

The clock extraction circuit 9 extracts a clock from the reproduction data Dp, and outputs an reproduction clock fr. The system controller 10 controls each part of the optical disc recording and reproducing apparatus 1. The output clock frequency generation circuit 11 generates the output clock fo on the basis of the second frequency control signal Scf2 from the system controller 10 at the time of reproduction of the optical disc 2. The change switch 12 supplies the input clock fi or the output clock fo to the spindle motor on the basis of the change control signal Ssw from the system controller 10. The input operation section 13 is an apparatus for inputting various commands into the system controller 10. The display section 14 displays various information from the system controller 10.

Figures 2A, 2B:
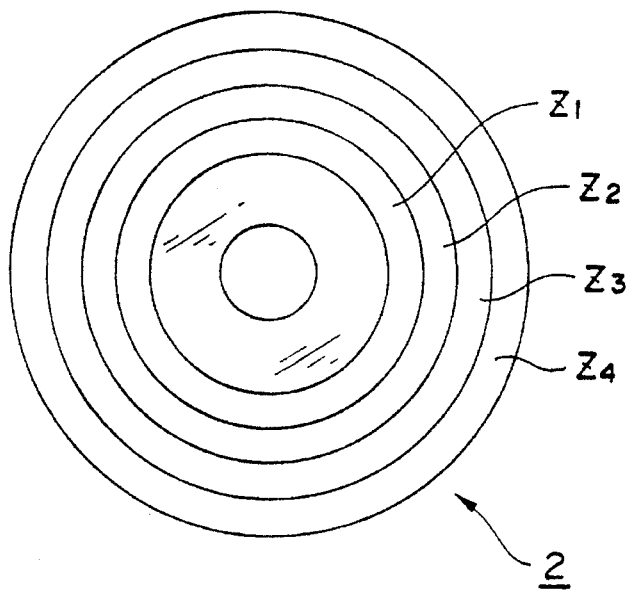
FIG. 2, consisting of FIG. 2A and FIG. 2B, are figures explaining the record state of ZCAV system optical disc used for the embodiment of the present invention.

Here, the recording format of the optical disc 2 of the ZCAV system used in the present embodiment, is explained prior to the explanation of the operation of the optical disc recording and reproducing apparatus. In this case, it is assumed for simplification of explanation that the number of zones of the ZCAV disc 2 is 4. As shown in FIG. 2A, the zones put in order from the inner circumferential side of the optical disc, are defined as a first zone Z1, a second zone Z2, a third zone Z3, and a fourth zone Z4, respectively.

The recordable amount of information in the record track (track for record of 1 round of the disc) at the inner most circumferential side of the optical disc, or the record amount of information of each record track of the first zone Z1, is defined as Q $(=(4/4)Q)$. The record clock in the first zone Z1 is defined as fi $(=(4/4)fi)$. The reproduction clock is defined as fo $(=fi=(4/4)fo)$.

In this case, the record data amount in each zones Z2 to Z4, the record clock fw, and the reproduction clock fr, become to be as shown in FIG. 2B.

Next, the operation of the optical disc recording and reproducing apparatus will be explained separately about the time of information record and information reproduction. During a time t required for the optical disc 2 to rotate once, in this case, (hereinbelow, it is referred to as one revolution time), it is assumed that the input data amount inputted from the input terminal IN, and the reproduction output data amount outputted from the output terminal OUT are equal to Q/t. In each zone Z1 to Z4, there are assumed to be 4 tracks. The change switch 12 is set to the side for supplying the input clock fi at the time of information record, and, is set to the side for supplying the output clock fo at the time of information reproduction, by the change control signal Ssw.

a) At the time of Information Record i) First zone Z1

Figure 3:
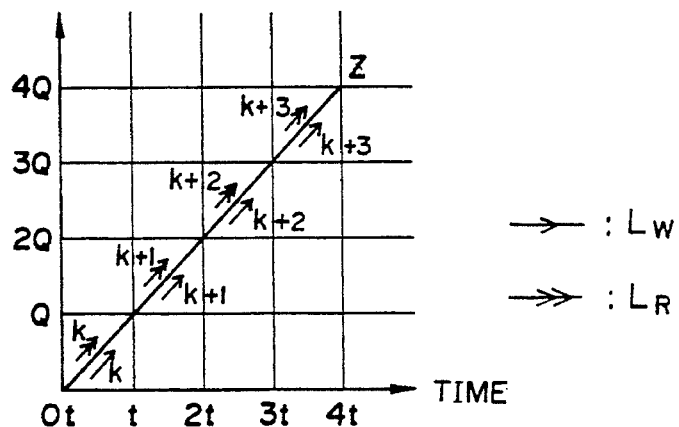
FIG. 3 is a diagram of record and reproduction operation in the first zone.

In the first zone Z1, as shown in FIG. 3, the input data Di is written by the input clock fi into the DRAM 6 under the control of the DRAM controller 7. At the same time, the optical pickup 4 traces the record tracks k, k+1, k+2, and k+3 in the order. The optical pickup 4 records the record data Dr outputted through the signal conversion circuit 5 from the DRAM 6, onto the optical disc 2, by the record clock fw of the same frequency as the input clock fi.

Therefore, the input data Di (=Dr) only passes the DRAM, and, almost at the same time of being inputted into the DRAM, is recorded onto the optical disc 2.

As the result, data of Q per one record track, is recorded to the first zone Z1. The total record data amount becomes 4Q.

ii) Second zone Z2

Figure 4:
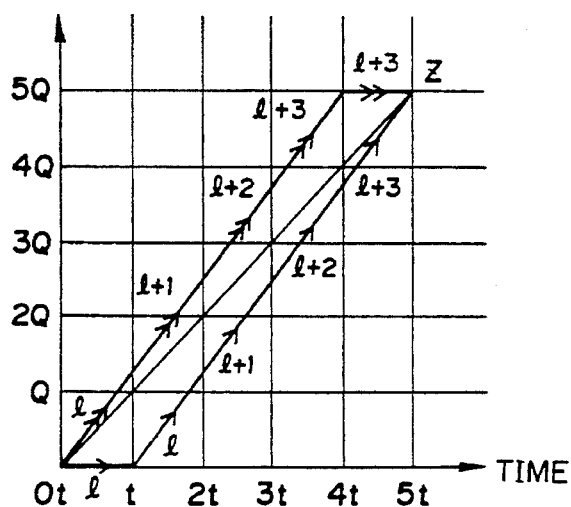
FIG. 4 is a diagram of record and reproduction operation in the second zone.

In the second zone Z2, as shown in FIG. 4, the recording characteristic curve LW changes in parallel with the time-axis between the time 0t and the time t. This indicates the following things. Namely, between the time 0t and the time t, the data is written into the DRAM 6 by the input clock fi. However, the optical pickup is only tracing the record track 1. The record data Dr is not outputted through the signal conversion circuit 5 from the DRAM 6. As the result, the record of data is not performed. Therefore, the difference of the data input characteristic curve Lin and the recording characteristic curve LW, i.e., the data amount of the input data Di stored into the DRAM 6, monotonously increases. And, it becomes maximum (=Q) at the time t.

After that, by carrying out the jump back of the optical pickup 4 to a position just before the start position of the record track 1, just before the time t, the trace of the record track 1 is begun at the same time of the time t. Data stored in the DRAM 6 is outputted by the record clock frequency fw $(=(5/4)fi)$ through the signal conversion circuit 5. The record to the record track 1 is performed up to the time 2t. Further at the same time, the input data Di is written into the DRAM 6 on the basis of the input clock fi.

In the same manner, between the time 2t and the time 5t, the input data Di stored in the DRAM 6 is outputted as the record data Dr through the signal conversion circuit 5 by tracing the record track l+1 to the record track l+3 in the order. The record data Dr is recorded by the record clock frequency fw $(=(5/4)fi)$ to the optical disc 2.

Here, the record clock fw $(=(5/4)fi)$ has a frequency higher than that of the input clock fi. Therefore, the data amount stored in the DRAM 6 decreases gradually. And, it becomes exactly zero at the time 5t. Therefore, all of the input data Di inputted during the time 0t to the time 5t, is recorded to the four record tracks 1 to l+3, at a fixed data rate (=5Q/4t). The total record data amount becomes 5Q.

iii) Third zone Z3

Figure 5:
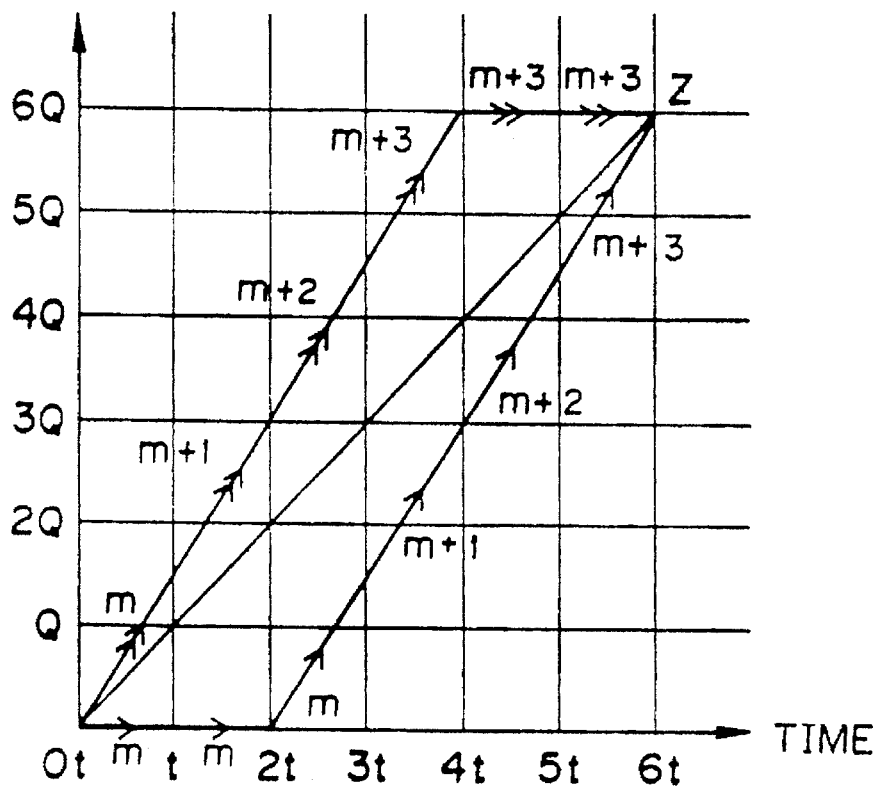
FIG. 5 is a diagram of record and reproduction operation in the third zone.

In the third zone Z3, as shown in FIG. 5, between the time 0t and the time 2t, the recording characteristic curve LW changes in parallel with the time-axis. This indicates the following things. Namely, between the time 0t and the time 2t, the data is written into the DRAM 6 by the input clock fi. However, the optical pickup 4 only traces the record track m. The record data Dr is not outputted through the signal conversion circuit 5 from the DRAM 6. The record of data is not performed.

Therefore, the difference of the data input characteristic curve Lin and the recording characteristic curve LW, i.e. the data amount of the input data Di stored in the DRAM 6, monotonously increases. And, it becomes the maximum (=2Q) at the time 2t.

By carrying out the jump back of the optical pickup 4 to a position just before the start position of the record track m Just before the time 2t, the trace of the record track m is begun at the same time of the time 2t. The data stored in the DRAM 6 is made to output by the record clock frequency fw $(=(6/4)fi)$ by means of the DRAM controller 7 and the signal conversion circuit 5. The record to the record track m is performed up to the time 3t. The input data Di is written into the DRAM 6 by the input clock frequency fi, concurrently.

Similarly, between the time 3t and the time 6t, by tracing the record track m+1 to the record track m+3, the input data Di stored in the DRAM 6 is outputted by the record clock fw (=(6/4)fi). And, it is recorded to the optical disc 2.

Here, the record clock fw (=(6/4)fi) has a frequency higher than that of the input clock fi. As the result, the data amount stored in the DRAM 6 decreases gradually. And, it becomes exactly zero at the time 6t. Therefore, all of the input data Di inputted between the time 0t and the time 6t, is recorded onto the four record tracks m to m+3 at a fixed data rate (=6Q/4t). The total record data amount becomes 6Q.

iv) Fourth zone Z4

Figure 6:
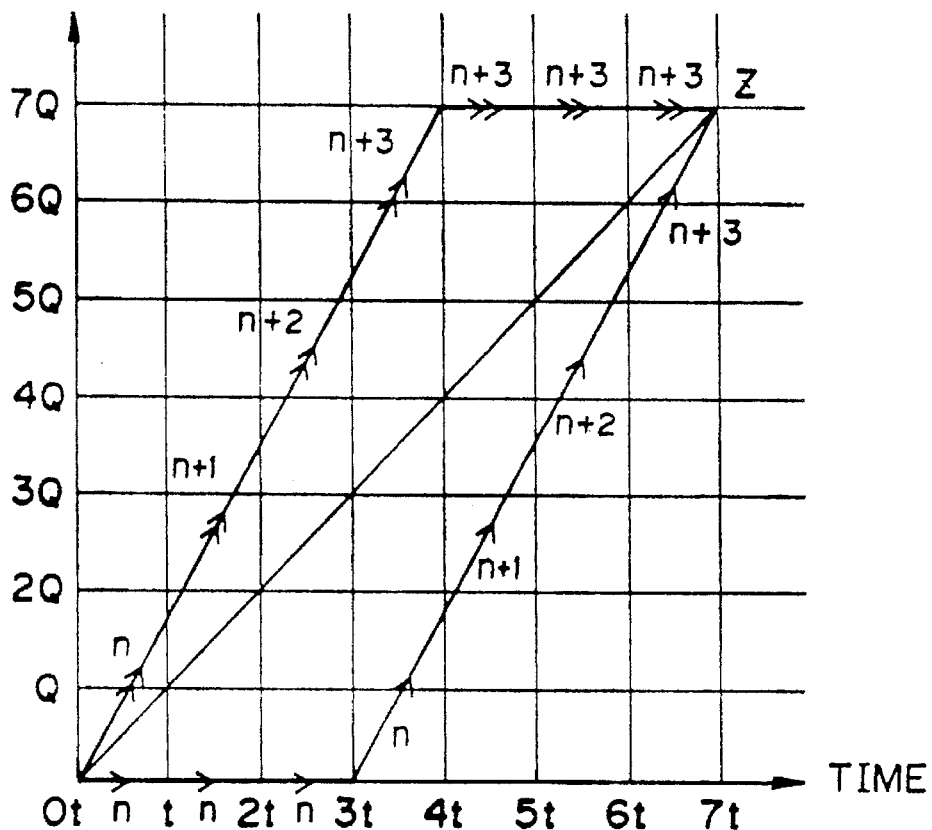
FIG. 6 is a diagram of record and reproduction operation in the fourth zone.

In the fourth zone Z4, as shown in FIG. 6, between the time 0t and the time 3t, the recording characteristic curve LW changes in parallel with the time-axis. This indicates the following things. Namely, between the time 0t and the time 3t, the input data Di is written into the DRAM 6 by the input clock fi. However, the optical pickup 4 only traces the record track n. The optical pickup 4 does not perform the record of data.

Therefore, the difference of the data input characteristic curve Lin and the recording characteristic curve LW, i.e. the data amount of the input data Di stored in the DRAM 6, monotonously increases. And, it becomes maximum (=3Q) at the time 3t.

After that, by carrying out the jump back of the optical pickup to a position immediately before the start position of the record track n just before the time 3t, the trace of the record track n is begun at the same time of the time 3t. The input data stored in the DRAM 6 through the DRAM controller 7 and the signal conversion circuit 5, is outputted as the record data Dr by the record clock fw (=(7/4)fi). The record to the record track n is performed up to the time 4t. The input data Di is written into the DRAM 6 by the input clock fi, concurrently.

Similarly, by tracing the record track n+1 to the record track n+3 between the time 4t and the time 7t, the input data Di stored in the DRAM 6 is outputted as the record data Dr by the record clock fw (=(7/4)fi). And, it is recorded to the optical disc 2.

Here, the record clock fw (=(7/4)fi) has a frequency higher than that of the input clock fi. As the result, the data amount of the input data Di stored in the DRAM 6 decreases gradually. And, it becomes exactly zero at the time 7t. Therefore, all of the input data Di inputted between the time 0t and the time 7t, is recorded onto the four record tracks n to n+3, at a fixed data rate (=7Q/4t). The total record data amount becomes 7Q.

If the recording operation of the present embodiment is performed as described above, the total record data-amount $\Sigma$ of the whole optical disc is given by the following expression.

$$\Sigma = 4Q + 5Q + 6Q + 7Q = 22Q$$

Therefore, the present embodiment can perform data recording with higher density than the total record data-amount $\sigma_{cav}=16Q$ (=4Q×4) in the case of recording by means of the conventional CAV system. Further, since it sets constant the angular velocity of the optical disc 2, the present embodiment can perform data recording with higher speed than the case of the conventional CLV system.

b) At the time of Information Reproduction i) First zone Z1

In the first zone Z1, the optical pickup reads the data from the optical disc 2 by the reproduction clock fr having the same frequency as the output clock fo, while tracing the record tracks k, k+1, k+2 and k+3 in the order, as shown in the reproduction characteristic curve LR of FIG. 3. The read out data is stored into the DRAM 6 as the reproduction data Dp through the signal conversion circuit 5 and the DRAM controller 7. At the same time, the reproduction data Dp stored in the DRAM 6 is read out from the DRAM 6 by the output clock fo. And, it is outputted to the external as the reproduction output data Do from the output terminal OUT.

Therefore, the reproduction data Dp (=Do) only passes the DRAM 6, and is outputted. As the result, if it sees from the external, it seems that the reproduction output data Do is outputted by the output clock fo from the optical disc 2. The output data rate becomes Q/t.

After that, when it becomes the time 4t, the trace of the record track k+3 is ended. In case of the continuous reproduction, the shift to the reproduction of the second zone Z2 is executed.

ii) Second zone Z2

In the second zone Z2, as shown in FIG. 4, the trace of the record track 1 is begun from the time 0t. The record data on the optical disc 2 is read by the reproduction clock fr (=(5/4)fo). The reproduction data Dp is stored into the DRAM 6 through the signal conversion circuit 5 and the DRAM controller 7. The reproduction of the record track 1 is performed up to the time t. At the same time, the DRAM controller 7 reads the reproduction data Dp from the DRAM 6, by the output clock fo. And, it outputs the reproduction data Dp from the output terminal OUT as the reproduction output data Do.

Similarly, between the time t and the time 4t, the record tracks are traced in the order of the record track l+1 to the record track l+3. The reproduction data Dp stored in the DRAM 6 is read out by the output clock fo. The reproduction data Dp is outputted from the output terminal OUT as the reproduction output data Do. In this case, the difference of the data output characteristic curve Lout and the reproduction characteristic curve LR, i.e. the data amount of the reproduction data Dp stored in the DRAM 6, monotonously increases. And, it becomes maximum (=Q) at the time 4t.

Between the time 4t and the time 5t, the reproduction characteristic curve LR changes in parallel with the time-axis. This indicates the following things. Namely, the data is read out from the DRAM 6 by the output clock frequency fo, between the time 4t and the time 5t, and is outputted as the reproduction output data Do from the output terminal OUT. However, immediately after completing the reproduction of the record track l+3 at the time 4t, the jump back of the optical pickup 4 is carried out to the position immediately after the start position of the record track l+3. After that, the optical pickup 4 only traces the record track l+3, and the reproduction of the data is not performed.

As the result, the data amount of the reproduction data Dp stored in the DRAM 6 decreases gradually. And, it becomes exactly zero at the time 5t. Therefore, all of the reproduction data Dp reproduced between the time 0t and the time 4t, is outputted as the reproduction output data Do at a fixed data rate (=Q/t). The total output data amount becomes 5Q.

After that, when it becomes the time 5t, the trace of the record track l+3 is ended. In case of the continuous reproduction, the shifting operation to the reproduction of the third zone Z3 is executed.

iii) Third zone Z3

In the third zone Z3, as shown in FIG. 5, the trace of the record track m is begun from the time 0t. The record data on the optical disc 2 is read by the reproduction clock fr (=(6/4)fo). The reproduction data Dp is stored into the DRAM 6 through the signal conversion circuit 5 and the DRAM controller 7. The reproduction of the record track m is performed up to the time t. The reproduction data Dp is read from the DRAM 6, by the output clock frequency fo, concurrently. The reproduction data Dp is outputted from the output terminal TOUT as the reproduction output data Do.

Similarly, between the time t and the time 4t, the record tracks are traced in the order of the record track m+1 to the record track m+3. The reproduction data Dp is stored into the DRAM 6. The reproduction data Dp stored in the DRAM 6 is read by the output clock fo, and is outputted-from the output terminal OUT. In this case, the difference of the data output characteristic curve Lout and the reproduction characteristic curve LR, i.e. the data amount of the reproduction data Dp stored in the DRAM 6, monotonously increases. And, it becomes maximum (=2Q) at the time 4t.

Between the time 4t and the time 6t, the reproduction characteristic curve LR changes in parallel with the time-axis. This indicates the following things. Namely between the time 4t and the time 6t, the data is read from the DRAM 6 by the output clock fo, and is outputted as the reproduction output data Do. However, the jump back of the optical pickup 4 is carried out immediately after completing the reproduction of the record track m+3 at the time 4t, to the position immediately after the start position of the record track m+3. After that, the optical pickup 4 only traces the record track m+3 until the time 5t, and does not reproduce the record data. Moreover, immediately after completing the trace of the record track m+3 at the time 5t, the jump back of the optical pickup t is carried out similarly to the position immediately after the start position of the record track m+3. After that, the optical pickup 4 only traces the record track m+3 until the time 6t, and does not reproduce the record data.

As the result, the data amount of the reproduction data Dp stored in the DRAM 6 decreases gradually. And, it becomes exactly zero at the time 6t. Therefore, all of the reproduction data Dp reproduced between the time 0t and the time 4t, is outputted as the reproduction output data Do at a fixed data rate (=Q/t). The total output data amount becomes 6Q.

When it becomes the time 6t, the trace of the record track m+3 is ended. In case of the continuous reproduction, the shifting operation to the reproduction of the fourth zone Z4 is executed.

iv) Fourth zone Z4

In the fourth zone Z4, as shown in FIG. 6, the trace of the record track n is begun from the time 0t. The record data on the optical disc 2 is read out by the reproduction clock fr (=(7/4)fo). The record data is stored into the DRAM 6 as the reproduction data Dp through the signal conversion circuit 5 and the DRAM controller 7. The reproduction of the record track n is performed up to the time t. The reproduction data Dp is read from the DRAM 6, by the output clock fo, concurrently. The reproduction data Dp is outputted from the output terminal OUT as the reproduction output data Do.

Similarly, between the time t and the time 4t, the record tracks are traced, in the order of the record track n+1 to the record track n+3 . The record data is read by the reproduction clock fr (=(7/4)fo), and is stored into the DRAM 6 as the reproduction data Dp. This reproduction data Dp stored in the DRAM 6, is read out by the output clock fo, and is outputted from the output terminal OUT. In this case, the difference of the data output characteristic curve Lout and the reproduction characteristic curve LR, i.e. the data amount of reproduction data Dp stored in the DRAM 6, monotonously increases. And, it becomes maximum (=3Q) at the time 4t.

Between the time 4t and the time 7t, the reproduction characteristic curve LR changes in parallel with the time-axis. This indicates the following things. Namely, between the time 4t and the time 7t, the reproduction data Dp is read from the DRAM 6 by the output clock fo, and is outputted as the reproduction output data Do. However, immediately after completing the reproduction of the record track n+3 at the time 4t, the lump back of the optical pickup 4 is carried out to the position immediately after the start position of the record track n+3. After that, the optical pickup 4 only traces the record track n+3, and does not reproduce record data until the time 5t. Immediately after completing the trace of the record track n+3 at the time 5t, the jump back of the optical pickup 4 is also carried out similarly to the position immediately after the start position of the record track n+3. After that, the optical pickup 4 only traces the record track n+3 until the time 6t. Immediately after completing the trace of the record track n+3 at the time 6t, the jump back of the optical pickup 4 is also carried out similarly to the position immediately after the start position of the record track n+3. After that, the optical pickup 4 only traces the record track n+3, and does not reproduce the record data on the optical disc 2 until the time 7t.

Therefore, the data amount of the reproduction data Dp stored in the DRAM 6 decreases gradually. And, it becomes exactly zero at the time 7t. As the result, all of the reproduction data Dp reproduced between the time 0t and the time 4t, is outputted as the reproduction output data Do at a fixed data rate (=Q/t). The total output data amount becomes 7Q.

After that, when it becomes the time 7t, the trace of the record track n+3 is ended. The reproduction operation is ended.

Only the case where the number of record zones is four, has been explained in the above first embodiment. However, it is possible to divide an information record surface into N record zones (N: natural number). Here, the record amount of information to be recorded on the record track of the optical disc located in the inner most circumferential side, or the record amount of information to be recorded in a zone of the optical disc located in the inner most circumferential side, while the optical disc revolves once, is defined as Q. In this case, to the nth (n:1, 2, . . . , N) record zone which is counted from the inner circumferential side of the optical disc, the information having the information amount as the following expression, is recorded.

$(N+n-1) \cdot Q/N$

The record clock of the first zone Z1 provided in the inner most circumferential side of the optical disc is expressed by fw. The reproduction clock is expressed by fr. In this case, the record clock fwn and the reproduction clock frn of the nth (n:1, 2, . . . , N) record zone, are constituted so that they may satisfy the following expressions, respectively.

$fwn = ((N+n-1)/N) \cdot fw$ $frn = ((N+n-1)/N) \cdot fr$

As described above, the capacity of 3Q is required at minimum for the capacity of the DRAM 6 in this first embodiment.

Second Embodiment

The above-mentioned first embodiment is constituted so that capacity of 3Q is required for the DRAM 6 at the minimum. However, this second embodiment is constituted so that it can decrease the capacity of the DRAM 6.

Next, with reference to FIG. 1, FIG. 7, and FIG. 8, the operations of this second embodiment will be explained separately for the information record and information reproduction. Only the third zone Z3 and the fourth zone Z4 will be explained below for the simplification of explanation.

a) At the time of Information Record i) Third zone Z3

Figure 7:
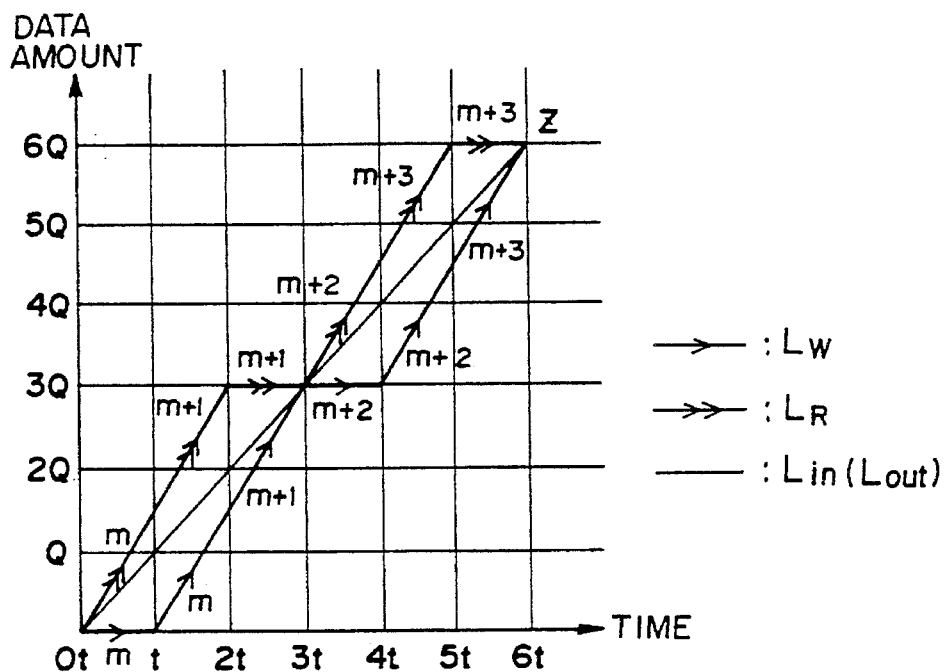
FIG. 7 is a diagram of record and reproduction operation in the third zone of a second embodiment.

In the third zone Z3, as shown in FIG. 7, the recording characteristic curve LW changes in parallel with the time-axis between the time 0t and the time t. This indicates the following things. Namely, between the time 0t and the time t, the data is written into the DRAM 6 by the input clock fi. The optical pickup 4 only traces the record track m, and does not record the record data Dr. Therefore, the difference of the data input characteristic curve Lin and the recording characteristic curve LW, i.e. the data amount of the input data Di stored in the DRAM 6, monotonously increases. And, it becomes maximum (=Q) at the time t.

After that, the jump back of the optical pickup 4 is carried out to the position immediately before the start position of the record track m just before the time t. The optical pickup 4 begins the trace of the record track m at the same time of the time t. The data stored in the DRAM 6 is made to output through the DRAM controller 7 and the signal conversion circuit 5 by the record clock fw (=(6/4)fi). Between the time t and the time 3t, the optical pickup 4 traces the record tracks m to m+1 in the order, and performs the record to the optical disc. Further, at the same time, the input data Di is written into the DRAM 6 by the input clock fi. Here, the record clock fw has a frequency higher than that of the input clock fi. As the result, the data amount of the input data Di stored in the DRAM 6 decreases Gradually. And, it becomes exactly zero at the time 3t.

When it becomes the time 3t, the recording characteristic curve LW changes again in parallel with the time-axis. The input data Di is written into the DRAM 6. However, the optical pickup 4 only traces the record track m+2. The DRAM controller 7 and the signal conversion circuit 5 do not output the record data Dr, and the recording operation of data is not performed. Therefore, the data amount of the input data Di stored in the DRAM 6 again monotonously increases. And, it becomes maximum (=Q) at the time 4t.

After that, the jump back of the optical pickup 4 is carried out to the position immediately before the start position of the record track m+2 just before the time 4t. The optical pickup 4 begins the trace of the record track m+2 at the same time of the time 4t. The optical pickup 4 outputs the input data Di stored in the DRAM 6, by the record clock fw (=(6/4)fi). The optical pickup 4 traces the record tracks m+2 to m+3 in the order between the time 4t and the time 6t, and performs the record to the optical disc. Further at the same time, the input data Di is written into the DRAM 6 by the input clock fi.

As the result, since the record clock fw has a frequency higher than that of the input clock fi, the data amount of the input data Di stored in the DRAM 6 decreases gradually. And, it becomes exactly zero at the time 6t. Therefore, all of the input data Di inputted between the time 0t and the time 6t, is recorded onto the four record tracks m to m+3 at a fixed data rate (=6Q/4t). The total record data amount becomes 6Q.

iv) Fourth zone Z4

Figure 8:
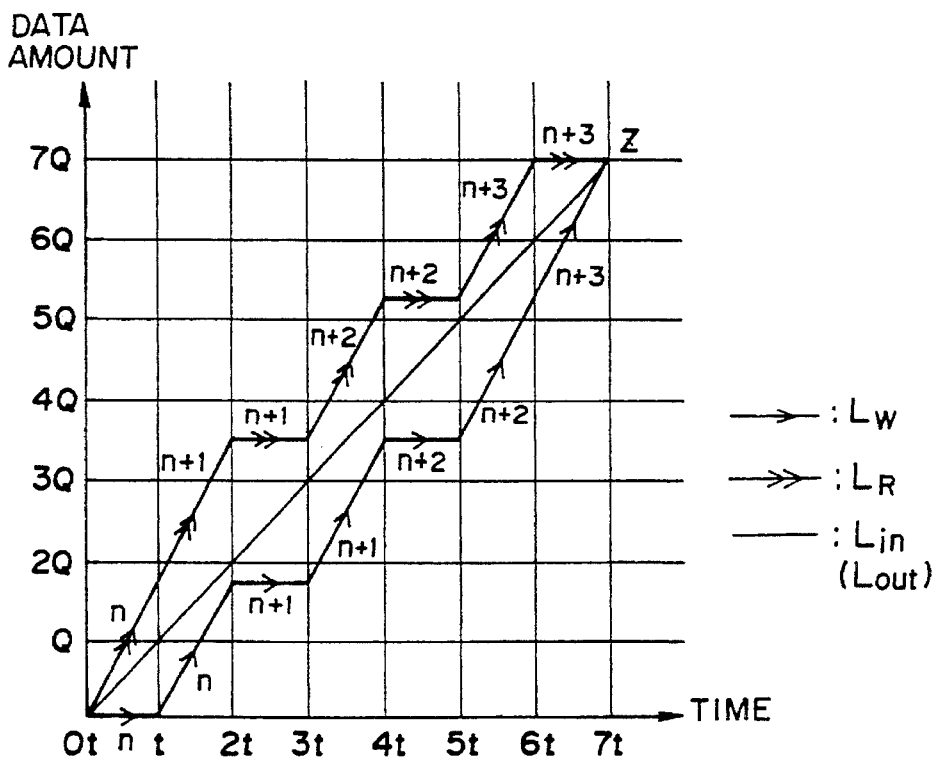
FIG. 8 is a diagram of record and reproduction operation in the fourth zone of the second embodiment.

In the fourth zone Z4, as shown in FIG. 8, between the time 0t and the time t, the recording characteristic curve LW changes in parallel with the time-axis. Between the time 0t and the time t, the input data Di is written into the DRAM 6 by the input clock fi. However, the optical pickup 4 only traces the record track n, and does not perform the record of data. Therefore, the data amount of the input data Di stored in the DRAM 6 monotonously increases. And, it becomes Q at the time t.

After that, the jump back of the optical pickup 4 is carried out to the position immediately before the start position of the record track n just before the time t. The optical pickup 4 begins the trace of the record track n at the same time of the time t. The input data Di stored in the DRAM 6 is outputted to the optical pickup 4 through the DRAM controller 7 and the signal conversion circuit 5 by the record clock fw (=(7/4)fi). The record to the record track n is performed up to the time 2t. Further at the same time, the input data Di is written into the DRAM 6 by the input clock fi. As the result, since the record clock fw has a frequency higher than that of the input clock fi, the data amount of the input data Di stored in the DRAM 6 decreases gradually. And, it becomes 0.25Q at the time 2t.

If it becomes the time 2t, the recording characteristic curve LW changes in parallel with the time-axis again. Between the time 2t and the time 3t, the input data Di is written into the DRAM 6 by the input clock fi, and the record of data is not performed. Therefore, the data amount of the input data Di stored in the DRAM 6 monotonously increases. And, it becomes 1.25Q at the time 3t.

After that, the jump back of the optical pickup 4 is carried out to the position immediately before the start position of the record track n+1 just before the time 3t. The optical pickup 4 begins the trace of the record track n+1 at the same time of the time 3t. The input data Di stored in the DRAM 6 is outputted to the optical pickup 4 by the record clock fw (=(7/4)fi). The record to the record track n+1 is performed up to the time 4t. Further at the same time, the input data Di is written in the DRAM 6 by the input clock fi. Here, the record clock fw has a frequency higher than the input clock fi. As the result, the data amount of the input data Di stored in the DRAM 6 decreases gradually. And, it becomes 0.5Q at the time 4t.

And, if it becomes the time 4t, the recording characteristic curve LW changes in parallel with the time-axis again. Between the time 4t and the time 5t, the input data Di is written into the DRAM 6 by the input clock fi. The output of the record data Dr is not performed from the signal conversion circuit 5, and the record of data is not performed. Therefore, the data amount of the input data Di stored in the DRAM 6 monotonously increases. And, it becomes 1.5Q at the time 5t.

After that, the jump back of the optical pickup 4 is carried out to the position immediately before the start position of the record track n+2 Just before the time 5t. The optical pickup 4 begins the trace of the record track n+2 at the same time of the time 5t. The input data Di stored in the DRAM 6 is outputted from the signal conversion circuit 5 by the record clock fw (=(7/4)fi). Between the time 5t and the time 7t, the optical pickup 4 traces the record tracks n+2 t n+3 in the order, and performs the record onto the optical disc. Further at the same time, the record data Dr is written into the DRAM 6 by the input clock fi.

Here, the record clock fw (=(7/4)fi) has a frequency higher than that of the input clock fi. As the result, the data amount of the input data Di stored in the DRAM 6 decreases gradually. And, it becomes exactly zero at the time 7t. Therefore, all of the input data Di inputted between the time 0t and the time 7t, is recorded onto the four record tracks n to n+3 at a fixed data rate (=7Q/4t). The total record data amount becomes 7Q.

b) At the time of Information Reproduction i) Third zone Z3

In the third zone Z3, as shown in FIG. 7, the trace of the record track m is begun from the time 0t. The record data on the optical disc 2 is read out by the reproduction clock fr $(=(6/4)fo)$. The reproduction of the record track m is performed up to the time t. The reproduction data Dp is stored to the DRAM 6 through the signal conversion circuit 5 and the DRAM controller 7. At the same time, the output reproduction data Do is read from the DRAM 6 by the output clock fo, and is outputted from the output terminal OUT.

Between the time t and the time 2t, the record track m+1 is traced similarly. The reproduction data Dp stored in the DRAM 6 is read by the output clock fo as the reproduction output data Do, and is outputted from the output terminal OUT. In this case, the data amount of reproduction data Dp stored in the DRAM 6, monotonously increases. And, it becomes maximum (=Q) at the time 2t.

Between the time 2t and the time 3t, the reproduction characteristic curve LR changes in parallel with the time-axis. The reproduction output data Do is read from the DRAM 6 by the output clock fo. However, immediately after completing the reproduction of the record track m+1 at the time 2t, the jump back of the optical pickup 4 is carried out to the position immediately after the start position of the record track m+1. After that, the optical pickup 4 only traces the record track m+1, and does not reproduce the record data. For this reason, the data amount of the reproduction data Dp stored in the DRAM 6 decreases gradually, And, it becomes exactly zero at the time 3t.

Then, the trace of the record track m+2 is begun from the time 3t. The record data on the optical disc 2 is read by the reproduction clock frequency fr $(=(6/4)fo)$.

The reproduction of the record track m+2 is performed up to the time 4t. The reproduction data Dp is stored into the DRAM. At the same time, the reproduction output data is read from the DRAM 6 by the output clock fo, and is outputted from the output terminal OUT.

Between the time 4t and the time 5t, the reproduction of the record track m+3 is performed similarly. The reproduction data Dp is stored into the DRAM 6. At the same time, the reproduction data Dp stored in the DRAM 6, is read by the output clock fo as the reproduction output data Do, and is outputted from the output terminal OUT. In this case, the data amount of reproduction data Dp stored in the DRAM 6 monotonously increases. And, it becomes maximum (=Q) again at the time 5t.

Between the time 5t and the time 6t, the reproduction characteristic curve LR changes in parallel with the time-axis. The reproduction output data Do is read from the DRAM 6 by the output clock fo. However, immediately after completing the reproduction of the record track m+3 at the time 5t, the jump back of the optical pickup 4 is carried out to the position immediately after the start position of the record track m+3. After that, the optical pickup 4 only traces the record track m+3, and does not reproduce the data.

As the result, the data amount of the reproduction data Dp stored in the DRAM 6 decreases gradually. And, it becomes exactly zero at the time 6t. Therefore, all of the reproduction data Dp reproduced between the time 0t and the time 2t, and between the time 3t and the time 5t, is outputted at a fixed data rate (=Q/t). The total output data amount becomes 6Q.

When it becomes the time 6t, the trace of the record track m+3 is ended. In case of the continuous reproduction, the shift to the reproduction of the fourth zone Z4 is performed.
iv) Fourth zone Z4

In the fourth zone Z4, as shown in FIG. 8, the trace of the record track n is begun from the time 0t. The record data on the optical disc 2 is read by the reproduction clock fr $(=(7/4)fo)$. The record data is stored into the DRAM 6 through the signal conversion circuit 5 and the DRAM controller 7. The reproduction of the record track n is performed up to the time t. At the same time, the data is read from the DRAM 6 by the output clock fo, and is outputted from the output terminal OUT as the reproduction output data Do.

Between the time t and the time 2t, the reproduction of the record track n+1 is performed similarly. The reproduction data Dp is stored into the DRAM 6. At the same time, the reproduction data Dp stored in the DRAM 6 is read by the output clock fo, and is outputted from the output terminal OUT as the reproduction output data Do. In this case, the data amount of the reproduction data Dp stored in the DRAM 6 monotonously increases. And, it becomes maximum (=1.5Q) at the time 2t.

Between the time 2t and the time 3t, the reproduction characteristic curve LR changes in parallel with the time-axis. The reproduction output data Do is outputted from the DRAM 6 by the output clock fo. However, immediately after completing the reproduction of the record track n+1 at the time 2t, the jump back of the optical pickup 4 is carried out to the position immediately after the start position of the record track n+1. After that, the optical pickup 4 only traces the record track n+1, and does not perform the reproduction of data. For this reason, the data amount of the reproduction data Dp in the DRAM 6 decreases Gradually. And, it becomes 0.5Q at the time 3t.

After that, the trace of the record track n+2 is begun from the time 3t. The record data on the optical disc is read by the reproduction clock fr $(=(7/4)fo)$. The reproduction of the record track n+2 is performed up to the time 4t. At the same time, the reproduction data Dp is read from the DRAM 6 by the output clock fo, and is outputted from the output terminal OUT as the reproduction output data Do. In this case, the data amount of the reproduction data Dp stored in the DRAM 6 monotonously increases. And, it becomes 1.25Q at the time 4t.

Between the time 5t and the time 6t, the reproduction characteristic curve LR changes in parallel with the time-axis. The reproduction data Dp is outputted from the DRAM 6 by the output clock fo as the reproduction output data Do. However, immediately after completing the reproduction of the record track n+2 at the time 4t, the jump back of the optical pickup 4 is carried out to the position immediately after the start position of the record track n+2. After that, the optical pickup 4 only traces the record track n+2, and does not reproduce the data. For this reason, the data amount of the reproduction data Dp in the DRAM 6 decreases gradually.

Then, the trace of the record track n+3 is begun from the time 5t. The record data on the optical disc 2 is read by the reproduction clock fr $(=(7/4)fo)$. The reproduction of the record track n+3 is performed up to the time 6t. At the same time, the reproduction data Dp is read from the DRAM 6 by the output clock frequency fo, and is outputted from the output terminal OUT as the reproduction output data. In this case, the data amount of reproduction data Dp stored in the DRAM 6 monotonously increases. And, it becomes Q at the time 6t.

Between the time 6t and the time 7t, the reproduction characteristic curve LR changes in parallel with the time-axis. The reproduction output data Do is outputted from the DRAM 6 by the output clock fo. However, immediately after completing the reproduction of the record track n+3 at the time 6t, the jump back of the optical pickup 4 is carried out to the position immediately after the start position of the record track n+3. After that, the optical pickup 4 only traces record track n+3, and does not reproduce the data. For this reason, the data amount stored in the DRAM decreases gradually. And, it becomes exactly zero at the time 7t. Therefore, all of the data reproduced between the time 0t and the time 2t, between the time 3t and the time 4t, and between the time 5t and the time 6t, is outputted at a fixed data rate (=Q/t). The total output data amount becomes 7Q.

When it becomes the time 7t, the trace of the record track n+3 is ended. The reproduction operation is ended.

By constituting as mentioned above, according to the second embodiment, the required capacity for the DRAM is 1.5Q at minimum. The memory capacity can be decreased.

Third Embodiment

Figure 9:
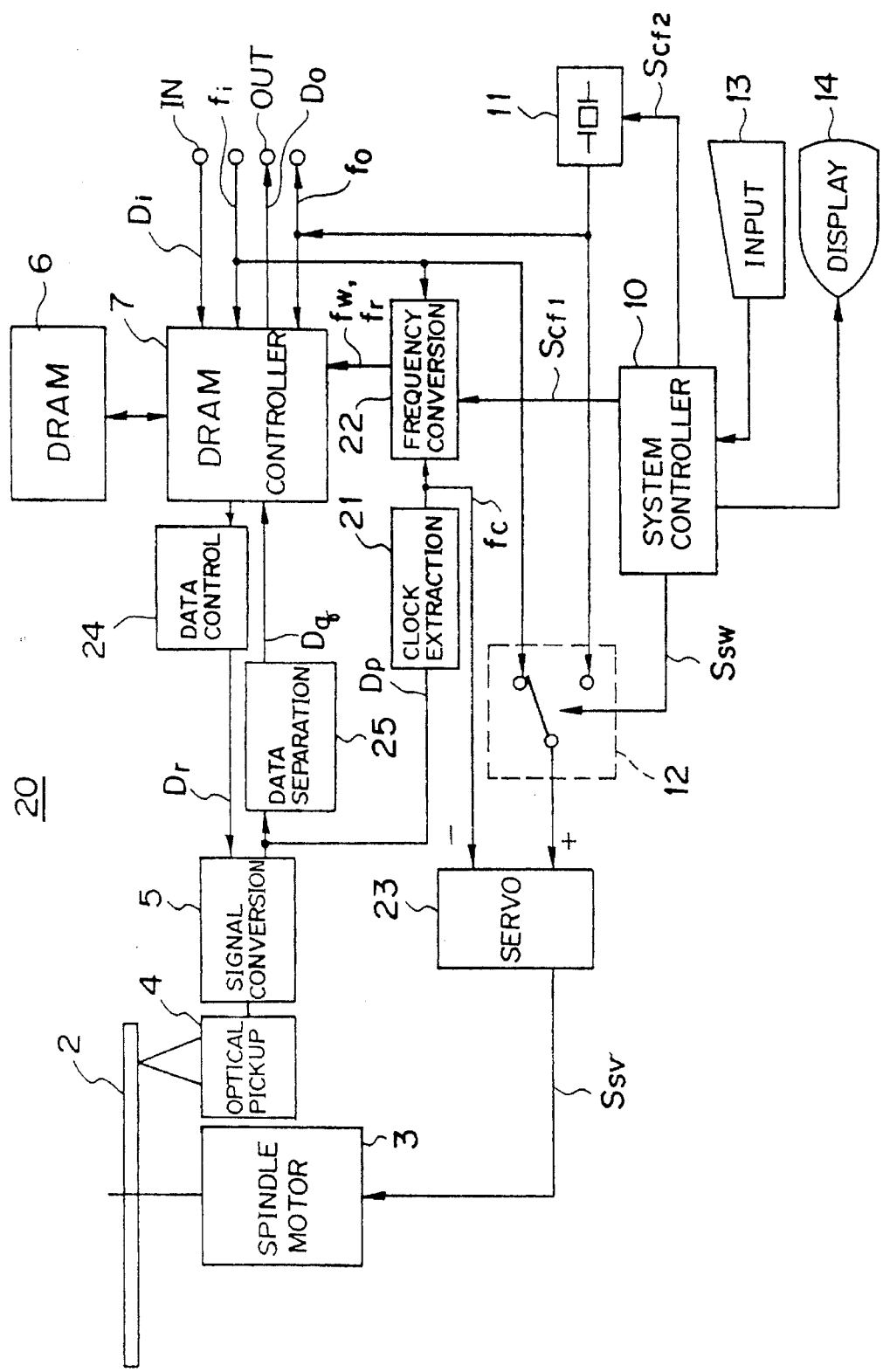
FIG. 9 is a block diagram which indicates the basic construction of a third embodiment.

FIG. 9 is the block diagram which indicates the basic construction of a third embodiment. The same elements as those in FIG. 1, carry the same reference numerals and the detailed explanations thereof are omitted.

In the aforementioned first and second embodiments, the explanations are made for the case of an open loop control system i.e. the case that the number of rotations control of the spindle motor 2 is performed by the clock given from the external to the spindle motor 2 itself. However, in this third embodiment, the number of rotations of the optical disc 2 is controlled by means of a closed loop control (feedback control) system by a standard clock fc, which is reproduced from the optical disc 2. In order to reproduce the standard clock fc for performing the number-of-rotations control, information for the number-of-rotations control needs to be provided in advance. For example, prepits are formed at equiangular intervals on a record track (planned to be a record track) on the optical disc of the state without record. Alternatively, wobbling pregrooves may be formed on the record track.

In FIG. 9, an optical disc recording and reproducing apparatus 20 has a spindle motor 3, an optical pickup 4, a signal conversion circuit 5, a clock extraction circuit 21, a frequency conversion circuit 22, an output clock generating circuit 11, a change switch 12, a servo-control section 23, a data control circuit 24, a data separation circuit 25, a DRAM 6, a DRAM controller 7, a system controller 10, an input operation section 13 and a display section 14.

The spindle motor 3 rotationally drives the optical disc 2. The optical pickup 4 irradiates a laser beam to the rotationally driven optical disc 2, and performs recording on the basis of the record signal. The optical pickup 4 receives the laser beam reflected by the optical disc 2, and outputs a reproduction signal. The signal conversion circuit 5 converts the record data Dr, and outputs it to the optical pickup 4 as a record signal. The signal conversion circuit 5 Converts the reproduction signal, and outputs it as the reproduction data Dp.

The clock extraction circuit 21 generates a standard clock fc of fixed frequency from the information of the prepits or pregrooves in the reproduction data Dp. On the basis of the first frequency Control signal Scf1, the frequency conversion circuit 22 converts the frequency of the standard clock fc, and outputs a record clock fw or a reproduction clock fr. The output clock generating circuit 11 generates an output clock fo on the basis of a second frequency control signal Scf2. The change switch 12 supplies the input clock fi or the output clock fo to the servo-control section 23 on the basis of a change control signal Ssw from the system controller 10. By comparing either one of the input clock fi and the output clock fo, which is selected by the change switch 12, with the standard clock fc, the servo-control section 23 outputs a servo-control signal Ssv for the spindle motor 3. The data control circuit 24 performs the control for recording the record data Dr only to the recordable predetermined domain on the optical disc 2. The data separation circuit 25 extracts and outputs only the reproduction data Dq in which the information of the prepit or the pregroove is removed from the reproduction data Dp reproduced from optical disc 2. The DRAM 6 stores the input data Di or the reproduction data Dq temporarily. The DRAM controller 7 controls the input and output of the data with respect to the DRAM 6. The system controller 10 controls each part of the optical disc recording and reproducing apparatus 20. The input operation section 13 is a section for inputting various control data into the system controller. The display section 14 displays various data.

Next, the operation of the third-embodiment will be explained separately for the time of information record and for the time of information reproduction in detail.

a) At the time of Information Record

The clock extraction circuit 21 generates the standard clock fc from the information of the prepit or pregroove in the reproduction data Dp. At this time, the servo-control section 23 controls the number of rotations of the spindle motor 3 so that the standard clock fc and the input clock fi are phase-synchronized. On the other hand, the standard clock fc is outputted to the frequency conversion circuit 22. The record clock fw is generated on the basis of this standard clock fc. The record clock fw is outputted to the DRAM controller 7. Successively, the DRAM controller 7 reads the input data Di from the DRAM 6 on the basis of this record clock fw. The DRAM controller 7 outputs the data Di to the data control circuit 24. The data control circuit 24 performs the control for recording the record data Dp only to the recordable predetermined domain on the optical disc 2. Thereby, the optical pickup 4 records the data to the recordable predetermined domain. Thus, the optical disc 2 is always rotated at the right number of rotations. As the result, the input data Di can be recorded at the right data rate onto the optical disc 2.

b) At the time of Information Reproduction

At the time of information reproduction, the standard clock fc is generated by the clock extraction circuit 21 in the same manner as in the time of information record. The servo-control section 23 performs the number-of-rotations control of the spindle motor 3 by the standard clock fc. In this state, the record data on the optical disc 2 reproduced by the optical pickup 4, is outputted as the reproduction data Dp to the data separation circuit 25 through the signal conversion circuit 5. As the result, the data separation circuit 25 extracts only the reproduction data Dq in which the information of the prepit or pregroove is removed from the reproduction data Dp reproduced from the optical disc 2. The data separation circuit 25 writes the reproduction data Dq into the DRAM 6 through the DRAM controller 7 by the reproduction clock fr generated by the frequency conversion circuit 22. Therefore, the optical disc 2 is always rotationally driven at the fixed number of rotations. The reproduction of the reproduction data Dp is performed. Thus, the right reproduction data Dq can be written into the DRAM 6. It becomes possible to perform the reproduction operation at the right data rate.

As described above, even if a slip arises between the spindle motor 3 and the optical disc 2 and thus the number of rotations of the spindle motor 3, and the number of rotations of the optical disc 2 become temporarily inharmonious to each other, an exact record and reproduction can be still performed at the fixed data rate, according to the third embodiment.

Fourth Embodiment

The input-and-output data rate and the amount of information which should be recorded, correspond perfectly to the input-and-output data rate and the record capacity of the optical disc, in each of the above embodiments. However, in this fourth embodiment, the input-and-output data rate is made to correspond to the external apparatus side. More precisely, this fourth embodiment is such an embodiment in which the input clock fix =k·fi and k<1 (k is slightly less than 1).

Next, the operation will be explained with reference to FIG. 1 and FIG. 10. Only the information record operation to the second zone Z2, and the information reproduction operation from the second zone Z2, will be explained for simplification of explanation. In this case, the input clock fix and k are decided beforehand as follows.

$$fix=0.9·fi(=(4.5/5)·fi)$$

That is to say, k=0.9

The record clock fw and the reproduction clock fr of the optical disc are assumed to be predetermined clocks exclusive to the second zone Z2.

a) At the time of Information Record

First, an operator sets up the input clock fix to the system controller 10 through the input apparatus 13 of the optical disc recording and reproducing apparatus 1. In this case, the input clock is set to be 0.9fi.

Thereby, in the case of the second zone Z2, the system controller 10 computes the time-to-wait-recording Tdl as follows.

Here, the time-to-wait-recording Tdl represents a waiting time for beginning the record after the time Tdl elapses. The record is not performed from the start position of the track 1.

As clearly shown in FIG. 4 of the first embodiment, the amount of the signal inputted during the 5 rotation time can be just recorded on the 4 tracks on the disc during the 4 rotation time, in the second zone Z2. On the contrary, the amount of the signal inputted during the 5 rotation time becomes as following, in this fourth embodiment.

$$5\times0.9Q=4.5Q$$

On the other hand, the amount of information recordable on the 4 tracks becomes as following.

$$4\times(5/4)Q=5Q$$

Therefore, the amount of information remains by the following amount.

$$5Q-4.5Q=0.5Q$$

The recordable amount of information during 1 rotation time is (5/4) Q. Thus, it is sufficient to constitute so as not to record the data during the time interval expressed below.

$$0.5Q/((5/4)Q)=0.4 \text{ rotations}$$

That is to say, from the start position of the track 1, Tdl: Tdl=0.4t

Here, the input clock to be set up, may not be arbitrary but fixed to some values. If it is in the latter case, the apparatus may be constituted as follows. Namely, it reads out the time-to-wait-recording Tdl stored in advance in the memory table in the system-controller 10, in correspondence with the setup of a dip switch, the input operation of the selection number by the input apparatus 13, and so on.

After this, the system controller 10 records the information concerning the time-to-wait-recording Tdl to one of predetermined domains of the optical disc. Thereby, the process at the time of reproduction becomes easy. Moreover, the system controller 10 may be constituted so that it may record the information concerning a set up frequency of the input clock fix to one of predetermined domain of the optical disc. By constituting in this manner, the reproduction can be easily performed by the output data rate equal to the input data rate on the basis of the information at the time of reproduction.

Figure 10:
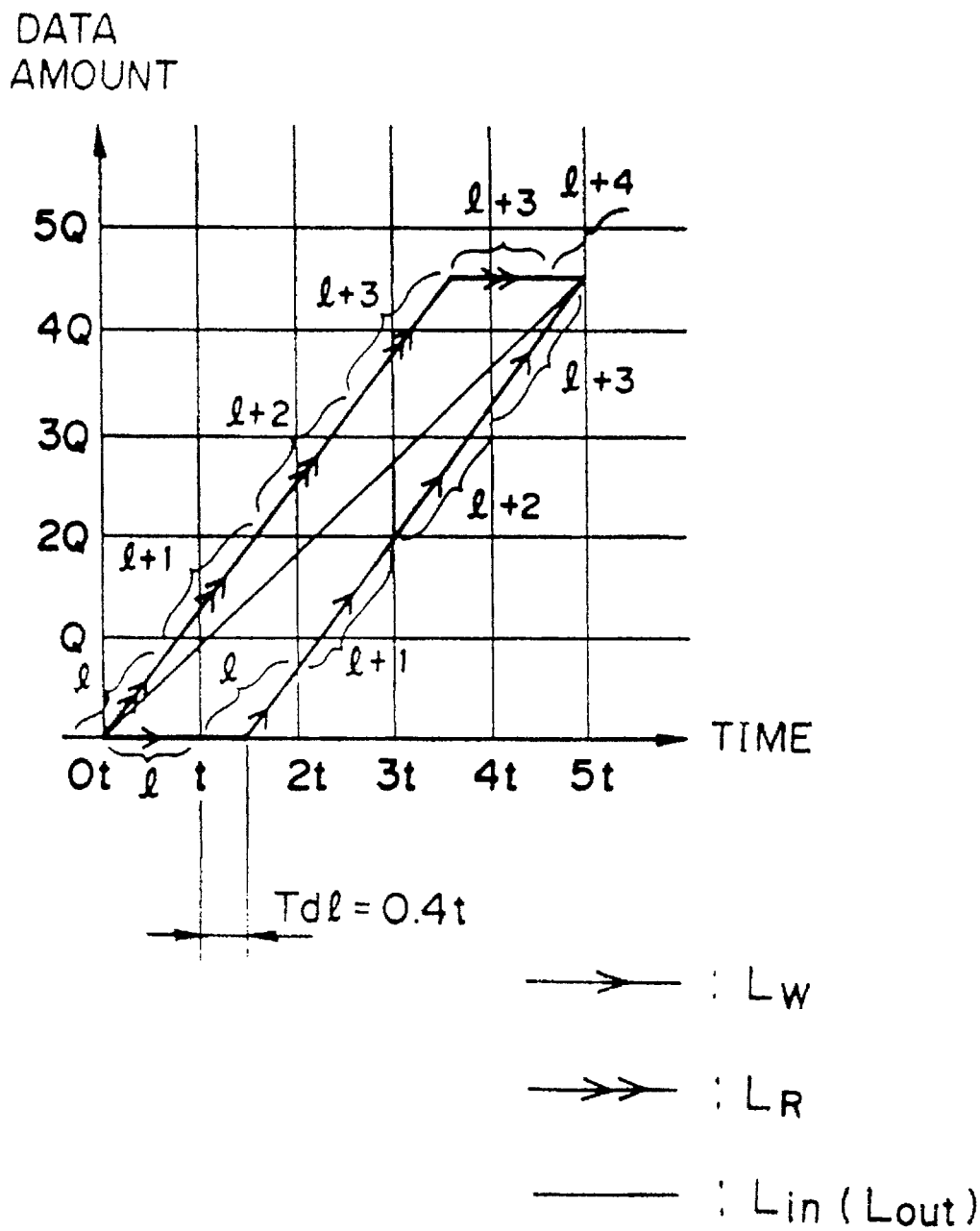
FIG. 10 is a diagram of record and reproduction operation in the second zone of a fourth embodiment.

Based on the time-to-wait-recording Tdl obtained as mentioned above, the record operation is performed as shown in FIG. 10.

First, the recording characteristic curve LW changes in parallel with the time-axis in the same manner as in the case of FIG. 4 of the first embodiment, between the time 0t and the time 1t. This indicates the following things. Namely, between the time 0t and the time 1t, the input data Di is written into the DRAM 6 by the input clock fix. However, the optical pickup 4 only traces the record track 1, and does not record the data. Next, right after the time 1t, the jump back of the optical pickup 4 is carried out to the position immediately after the start position of the record track 1. After that, during the time-to-wait-recording Tdl=0.4t, the same operation as performed between the time 0t and the time It, is performed. Thus, the difference of the data input characteristic curve Lin and the recording characteristic curve LW, i.e. the data amount of the input data Di stored in the DRAM 6, monotonously increases. And, it becomes maximum (=1.4×0.9Q=1.26Q) at the time 1.4t. After that, the data stored in the DRAM 6 is made to output through the DRAM controller 7 and the signal conversion circuit 5 by the record clock fw (=(5/4)fi) from the time 1.4t. Between the time 1.4t and the time 5t, the portion of the record track I from the middle to I+3, is traced in the order. The record of the record data Dr to the optical disc is performed. At the same time, the input data. Di is written into the DRAM 6 by the input clock fix. Here, the record clock fw (=(5/4)fi) has a frequency quite higher than that of the input clock fix. As the result, the data amount of the input data Di stored in the DRAM 6 decreases gradually. And, it becomes exactly zero at the time 5t. Therefore, all of the input data Di inputted between the time 0t and the time 5t, is recorded onto the four record track 1 to l+3 at a fixed data rate (=4.5Q/5t). The total record data amount becomes 4.5Q.

As the result, as compared with the case of the first embodiment (in which total record data-amount =5Q), the total record data-amount decreases by as much as 0.5 Q. Thus, there arises a non-recorded domain in the second zone Z2 of the optical disc.

b) At the time of Information Reproduction

First, the system controller 10 of the optical disc recording and reproducing apparatus, reproduces the information concerning the time to-wait-recording Tdl from the predetermined domain of the optical disc. In case that the information concerning the frequency of the input clock fix set up at the time of recording, is recorded, the system controller 10 reproduces this also.

Next, the system controller 10 perform reproduction as follows, on the basis of the reproduced time-to-wait-recording Tdl=0.4t.

First, the optical pickup 4 begins the trace of the track 1. When Tdl=0.4t elapses from the start position of the track 1, it is expressed as the time 0t.

Next, as shown in the reproduction characteristic curve LR of FIG. 10, after the time 0t, the optical pickup 4 traces the remaining portion of the track 1, track l+1, track l+2, and track l+3 in the order. At the same time, the system controller 10 reads the record data on the optical disc 2 by the reproduction clock fr (=(5/4)fo). The system controller 10 stores the reproduction data Dp into the DRAM 6 through the signal conversion circuit 5 and the DRAM controller 7. Since Tdl=0.4t, the trace of the track l+3 is completed at the time 3.6t.

Further at the same time, the DRAM controller 7 reads the data from the DRAM 6 by the output clock fo, and outputs it from the output terminal OUT as the reproduction output data DO.

In case that the information concerning the frequency of the input clock fix set up at the time of recording, is recorded on the optical disc 2, the system controller 10 makes the output clock frequency generation circuit 11 generate the output clock fox equal to the input clock fix from the second frequency control signal Scf2. The system controller 10 reads the data from the DRAM 6 by this output clock fox, and outputs the data from the output terminal OUT as the reproduction output data Do. As the result, the output data rate of the reproduction output data Do becomes equal to the input data rate (=4.5Q/5t).

In the case of the above-mentioned example, the difference of the data output characteristic curve Lout and the reproduction characteristic curve LR, i.e., the data amount of reproduction data Dp stored in the DRAM 6, monotonously increases. And, it becomes maximum at the time 3.6t.

Between the time 3.6t and the time 5t, the reproduction characteristic curve LR changes in parallel with the time-axis. This indicates the following things. Namely, between the time 3.6t and the time 5t, the data is read from the DRAM 6 by the output clock frequency fo, and is outputted as the reproduction output data Do from the output terminal OUT. However, at the time 3.6t, the jump back of the optical pickup 4 is carried out immediately after completing the reproduction of the data recorded on the record track l+3, to the position immediately after the start position of the record track l+3. After that, the optical pickup 4 only traces the record the track l+3, and does not perform the reproduction of the data.

As the result, the data amount of reproduction data Dp stored in the DRAM 6 decreases Gradually. And, it becomes exactly zero at the time 5t. Therefore, all of the reproduction data Dp reproduced between the time 0t and the time 3.6t, is outputted as the reproduction output data Do at a fixed data rate. The total output data amount becomes 4.5Q.

As explained above in detail, it is possible to record and reproduce easily and certainly the data even if the input-and-output data rate is set to be other than the optimum input-and-output data rate for the record and reproduction of the optical disc (in view of the efficiency in use), according to the fourth embodiment.

Fifth Embodiment

In each of the above embodiments, the input clock fi (or the input data rate) from the external is known prior to the recording operation. However, the present embodiment is constituted so that it can automatically correspond to the case that the input clock is not unknown before the recording operation.

Figure 11:
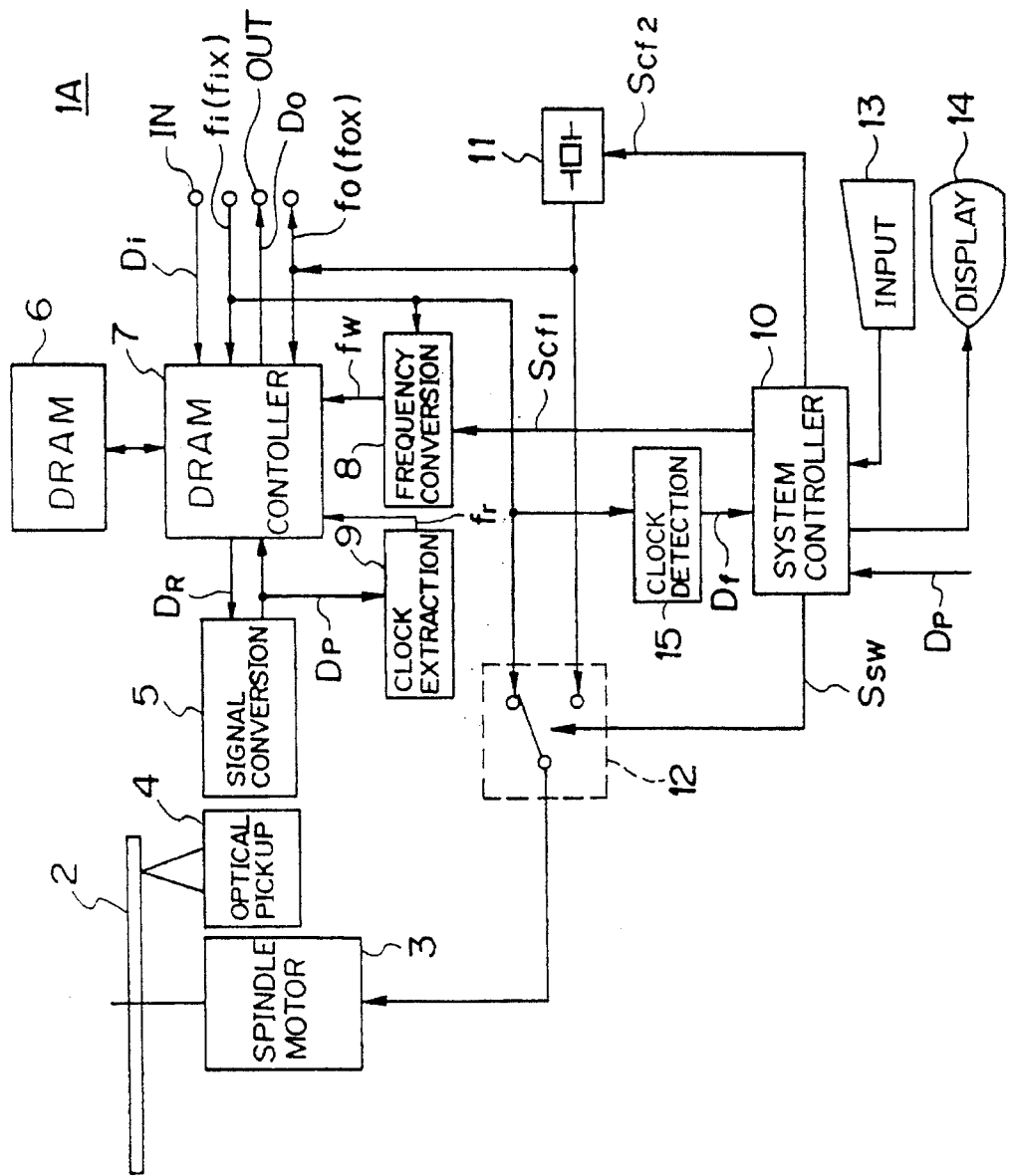
FIG. 11 is a block diagram which indicates the basic construction of a fifth embodiment.

Next, the operation is explained with reference to FIG. 11. In FIG. 11, the same elements as those in FIG. 1, carry the same reference numerals and the detailed explanations thereof are omitted for simplification of explanation.

Compared with the optical disc recording and reproducing apparatus 1 of the first embodiment of FIG. 1, the optical disc recording and reproducing apparatus 1A of FIG. 11 differs in that a clock detection circuit 15 for detecting the frequency of the input clock fix of unknown frequency is provided.

For example, this clock detection circuit 15 consists of a PLL (Phase Lock Loop) circuit. The clock detection circuit 15 detects the frequency of the input clock fix. The clock detection circuit 15 outputs the corresponding frequency detection data Df to the system controller 10.

By constituting in this manner, the system controller can know the value of k in the fourth embodiment. Thus, the record and reproduction operation thereafter, can be performed just in the same manner as the case of the fourth embodiment.

As described above, even if the input data rate of the data to be recorded, is unknown, it can detect the input data rate automatically, according to the fifth embodiment. Therefore, it is possible to perform easily and certainly the record and reproduction, without increasing the operator's troublesome, according to the fifth embodiment.

Each of the above embodiments can realize the large scale and high-speed access under the condition of the fixed angular velocity (number of rotations) with respect to the optical disc of ZCAV system. Recording and reproducing at a fixed data rate, become possible.

Moreover, each of the above embodiments was explained only about the write once type optical disc and the recording and reproducing apparatus thereof. However, the present invention is applicable also to an optical disc of rewritable type, such as an optical magnetic disc, and the recording and reproducing apparatus thereof.

Each of the above mentioned embodiments, has both functions of recording and reproducing the optical disc. However, it is easily understood that the embodiments include the constructions of the optical disc recording apparatus, and the optical disc reproducing apparatus., each of which can be obtained by simply neglecting the elements for enabling the other function, so that the apparatus having only one function i.e. the recording function or the reproducing function, can be realized with a relatively low cost and simple construction.

In case of the optical disc recording apparatus, the frequency conversion device converts the clock frequency of the input clock data corresponding to the record data inputted from the external, and outputs the record clock data corresponding to the record zone to be recorded, to the memory device, according to the first invention. The memory device stores the record data by the timing corresponding to the input clock data, and outputs it to the record device on the basis of the record clock data. The record device records the record data outputted from the memory device, to the optical disc rotationally driven by the drive device at a constant angular velocity. Consequently, even if the input clock data is fixed, the record data can be recorded by the record clock data corresponding to each record zone of the optical disc, i.e. by the data rate corresponding to each record zone, so that the record information density can be increased, and the information, to which the fixed data input-and-output rate is required, can be recorded.

In case of the optical disc reproducing apparatus, the optical pickup device reads the record information on the optical disc rotationally driven by the drive device at a constant angular velocity, and outputs it to the clock extraction device as the reproduction data. The clock extraction device extracts the reproduction clock data from the reproduction data, and outputs it to the memory device. The memory device stores the reproduction data by the timing corresponding to the reproduction clock data, and outputs it on the basis of the output clock data from the external. Consequently, even if the information is recorded at the data rate which differs for every record zone of the optical disc, the reproduction data can be outputted to the external at a fixed data rate, so that the access speed can be increased.

According to the optical disc of the present embodiment, the information amount expressed by the following expression is recorded on the record track of the nth record zone counted from the inner most circumferential side of the optical disc (n:1, 2, ..., N; Q represents the record amount of information of the record track located at the inner most circumferential side of the record zone of the optical disc).

$$(N+n-1) \cdot Q/N$$

Consequently, the record information density can be increased, and the access speed can be made high since it is possible to rotationally drive by the fixed angular velocity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc recording apparatus for dividing an information record surface of an optical disc into a plurality of record zones and recording information at a data rate which differs for every record zone, said optical disc recording apparatus comprising:

a drive means for rotationally driving the optical disc by a constant angular velocity;

a frequency conversion means for converting a clock frequency of input clock data corresponding to record data inputted from the external which is to be recorded on the optical disc, to record clock data, which frequency is a predetermined function of the clock frequency of the input clock data, and is varied corresponding to the record zone to be recorded, and outputting the record clock data;

a memory means for storing the record data by a timing corresponding to the input clock data, and outputting the record data on the basis of the record clock data; and a record means for recording the record data outputted from the memory means, to the optical disc, wherein the input clock data is inputted to said drive means, and said drive means drives the optical disc by the constant angular velocity based on the input clock data.

2. An optical disc recording apparatus according to claim 1, wherein said memory means comprises a DRAM and a DRAM controller.

3. An optical disc recording apparatus according to claim 1, wherein said record means comprises an optical pickup adapted to selectively record and just trace a record track of the record zone without recording, and to jump back to a start position of the record track.

4. An optical disc recording apparatus according to claim 1, further comprising a system controller for generating a frequency control signal to the frequency conversion means, the frequency conversion means converting the clock frequency by a ratio indicated by the frequency control signal.

5. An optical disc recording apparatus according to claim 4, further comprising an input clock detection means for detecting a frequency of the input clock data and outputting the detection data to the system controller, the system controller determining the frequency control signal by the detection signal.

6. An optical disc reproducing apparatus for reproducing an optical disc, which information record surface is divided into a plurality of record zones and to which information is recorded at a data rate which differs for every record zone, said optical disc reproducing apparatus comprising:

a drive means for rotationally driving the optical disc by a constant angular velocity;

an optical pickup means for reading record data on the optical disc, and outputting it as a reproduction data;

a clock extraction means for extracting reproduction clock data from the reproduction data; and a memory means for storing the reproduction data in accordance with a timing corresponding to the reproduction clock data, and outputting the reproduction data on the basis of output clock data, which is generated independently from the reproduction clock data and is inputted from the external, wherein the output clock data is inputted to said drive means, and said drive means drives the optical disc by the constant angular velocity based on the output clock data.

7. An optical disc reproducing apparatus according to claim 6, wherein said memory means comprises a DRAM and a DRAM controller.

8. An optical disc reproducing apparatus according to claim 6, further comprising means for servo-controlling the drive means on the basis of the reproduction clock data and the output clock data so that the reproduction clock data and the output clock data are phase-synchronized with each other.

9. An optical disc reproducing apparatus according to claim 6, wherein said optical pickup means is adapted to selectively reproduce and just trace a record track of the record zone without reproducing, and to jump back to a start position of the record track.

10. An optical disc recording and reproducing apparatus for dividing an information record surface of an optical disc into a plurality of record zones and recording information at a data rate which differs for every record zone, said optical disc recording and reproducing apparatus comprising:

a drive means for rotationally driving the optical disc by a constant angular velocity;

a frequency conversion means for converting a clock frequency of input clock data corresponding to record data inputted from the external which is to be recorded on the optical disc, to record clock data, which frequency is a predetermined function of the clock frequency of the input clock data, and is varied corresponding to the record zone to be recorded, and outputting the record clock data;

a memory means for storing the record data in accordance with a timing corresponding to the input clock data, and outputting the record data on the basis of the record clock data;

an optical pickup means for recording the record data outputted from the memory means, to the optical disc, and for reading the record data on the optical disc and outputting it as a reproduction data; and a clock extraction means for extracting reproduction clock data from the reproduction data, the memory means storing the reproduction data from the optical pickup means in accordance with a timing corresponding to the reproduction clock data, and outputting the reproduction data on the basis of output clock data, which is generated independently from the reproduction clock data and is inputted from the external, wherein the input clock data is inputted to said drive means, and said drive means drives the optical disc by the constant angular velocity based on the input clock data in case of recording and the output clock data is inputted to said drive means, and said drive means drives the optical disc by the constant angular velocity based on the output clock data in case of reproducing.

11. An optical disc recording and reproducing apparatus according to claim 10, further comprising a switch means for selectively supplying the drive means with one of the input clock data and the output clock data, the drive means being adapted to drive the optical disc by the angular velocity based on the clock data supplied by the switch means.

12. An optical disc recording and reproducing apparatus according to claim 10, further comprising means for servo-controlling the drive means on the basis of the reproduction clock data and the input clock data so that the reproduction clock data and the input clock data are phase-synchronized with each other while recording.

* * * * *